METHOD OF FORMING A SPIRALLY WOUND ROTARY BRUSH

Original Filed July 2, 1959 3 Sheets-Sheet 1

INVENTOR.
RALPH F. TILGNER

BY Oscar Spencer
ATTORNEY

June 12, 1962 R. F. TILGNER 3,038,759
METHOD OF FORMING A SPIRALLY WOUND ROTARY BRUSH
Original Filed July 2, 1959 3 Sheets-Sheet 2
FIG. 9
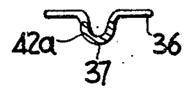
FIG. 8
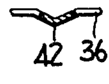
FIG. 7
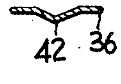
FIG. 6
38
FIG. 5
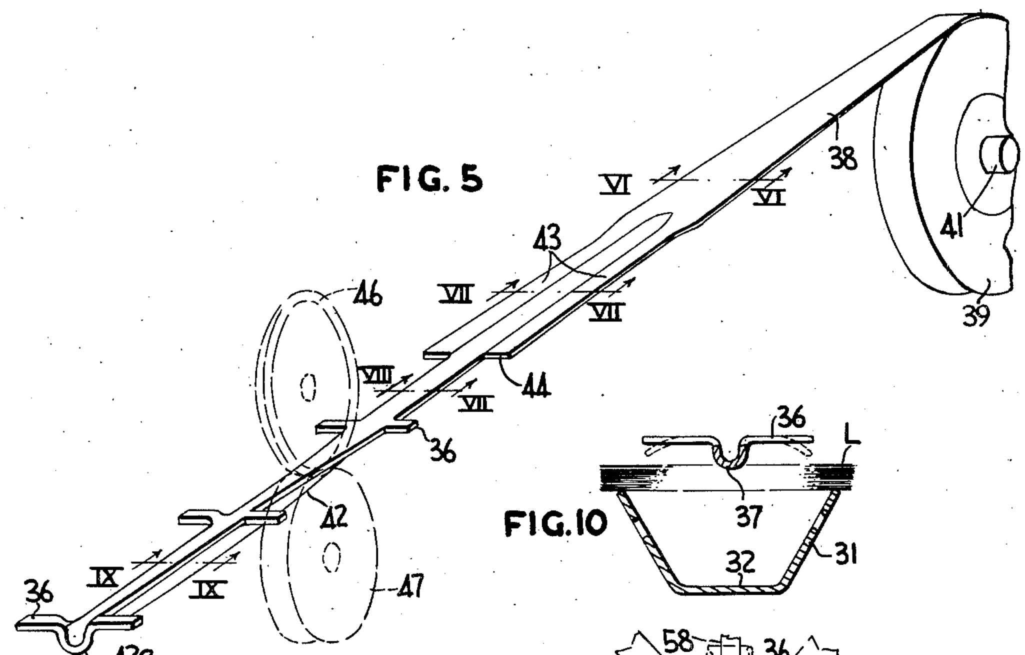
FIG. 10
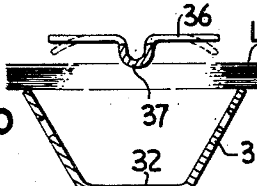
FIG. 11
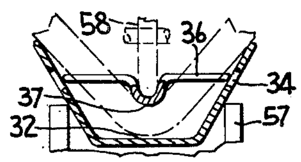
FIG. 12
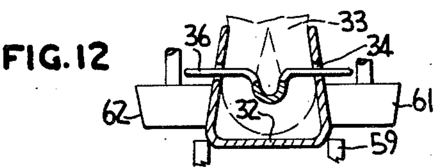
FIG. 13
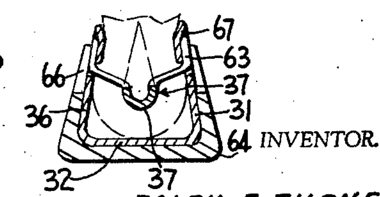
FIG. 14
73 74 70 72
FIG. 15
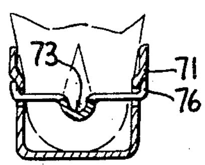
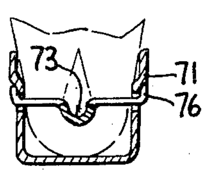
FIG. 16
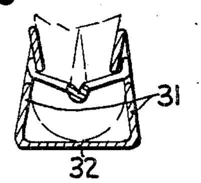
INVENTOR.
BY RALPH F. TILGNER
Oscar L. Spencer
ATTORNEY

METHOD OF FORMING A SPIRALLY WOUND ROTARY BRUSH

Original Filed July 2, 1959 3 Sheets-Sheet 3

INVENTOR.
RALPH F. TILGNER

BY Oscar L Spencer
ATTORNEY

United States Patent Office 3,038,759

Patented June 12, 1962

3,038,759

METHOD OF FORMING A SPIRALLY WOUND ROTARY BRUSH

Ralph F. Tilgner, Ellicott City, Md., assignor to Pittsburgh Plate Glass Company, Allegheny County, Pa., a corporation of Pennsylvania Original application July 2, 1959, Ser. No. 824,568, now Patent No. 3,002,212, dated Oct. 3, 1961. Divided and this application Oct. 17, 1960, Ser. No. 72,264
4 Claims. (Cl. 300—21)

This invention relates to a method of forming a brush construction and it has particular relation to a brush construction comprising means for locking the filamentary core in the channel-like backing of a brush strip which is spirally wound upon an appropriate mandrel, and concurrently for holding the side walls of said channel backing from spreading.

It has heretofore been proposed to fabricate power driven brushes by spirally winding a continuous brush strip formed by locking doubled fill material in a channel-like backing element by means of a filamentary core disposed in the bight portions of the fill material.

Such brushes are relatively cheap to manufacture because an appropriate backing element can be formed from a continuous tape by means of rollers or other instrumentalities and at the same time, the fill material may be inserted in the element and locked by the filamentary core by use of available automatic machinery. The resultant brush strip is wound as it is formed, upon the mandrel and the ends are customarily secured to the mandrel by appropriate devices to provide a finished rotary power driven brush.

Although the process of forming such brushes is relatively inexpensive to operate, certain objectionable features are often encountered in the use of the resultant brushes. For example, when the brushes are driven at high speed, as is often desirable in some brushing operations, considerable centrifugal force is exerted by the fill material, the filamentary core and the channel element itself. Often the ends of the strip become loosened by the force with the result that the strip is unwound and the fill material may be thrown about, producing a hazard for personnel and equipment that may be in the vicinity.

It is also apparent that breakage of the brush strip at a point intermediate of the ends may occur with results similar to those above described.

Moreover, in the running of the brush, the fill material may sometimes be impelled by tangential force generated by its contact with the work, to migrate along the channel element.

Such migration may force the side walls of the channel backing element apart and there is likelihood of loss of fill material at points along the spiral, which loss when once initiated, leaves the adjacent fill material inadequately supported so that progressive break-down of the brush may ensue.

It will further be apparent that in the winding of the strip, to form a spiral, the edges of the side walls of the channel are stretched and this may produce a tendency for them to spread or flatten out.

In order to reduce the possibility of the filamentary core becoming loosened in or displaced from the channel backing element and thus permitting loss of the fill material and also to prevent migration of the fill material in the channel backing element, it has been suggested to form the side walls of the latter element with integral tabs projecting inwardly as teeth and being adapted to engage the outer perimeter of the filamentary core to hold the latter in place.

Disadvantages of this construction also manifest themselves. For example, in order to provide teeth of adequate strength, it is necessary to form cuts in the side walls extending a substantial portion of the radial width of the latter, thus greatly weakening side walls of the channel backing of the brush strip against tension forces. When a strip thus formed with teeth is subjected to circularization in the formation of a spirally wound brush, rupture or tearing of the channel backing at the points where the cuts are formed is likely to occur.

It will also be apparent that teeth merely project as cantilevers secured at one end only across the top of the filamentary core and the inner ends thereof are not supported. When a strip embodying such construction is subjected to severe backward bending, as in winding it upon a mandrel, the side walls may still tend to flatten out to free the teeth from the core. Also, the centrifugal force generated upon the core when the brush is rotated at high speed, tends to force the tips of the teeth radially outwardly, thus bending them and/or distorting the side walls of the channel backing element with the result that sometimes the filamentary core becomes disengaged from the locking teeth and the construction may fail. The teeth offer no resistance whatever to this behavior.

A further disadvantage of the conventional construction resides in the fact that the fill material looped about the core, is a poor conductor of heat, which is often generated at a rapid rate within the brush strip due to the movements of said material. Since there is then no effective path for conduction of this heat laterally to the sides of the strip, it builds up in the strip and often shortens the life of the construction.

The present invention contemplates a method of forming a rotary brush, which comprises a spirally wound strip element in which the core holding the fill material in the channel backing element is formed of a flat tape having laterally projecting teeth, the tips of which are locked in appropriate openings in the side wall and are then clinched upon the outside of the walls in such manner as positively to hold the core in the channel backing element and also positively to tie the side walls together in such manner that spreading thereof is impossible. Concomitantly, the teeth and the core to which they are attached, provide effective metallic paths for conduction of heat from within the strip to the side walls.

Features that are also permissible in this construction reside in the fact that the openings in the channel backing element receiving the transverse teeth of the core, may be formed as slots which are relatively narrow in radial direction and which, therefore, weaken the side walls but to a moderate degree.

For a better understanding of the invention, reference may now be had to the accompanying drawings in which like numerals refer to like parts and in which FIG. 1 is a side elevational view of a brush formed of a strip constructed in accordance with the principles of the invention.

FIG. 5 is an isometric view illustrating the cutting and preliminary shaping of a continuous ribbon or tape of sheet metal, such as steel, in order to form a core for locking the fill material in the channel of the brush strip.

FIGS. 6, 7, 8 and 9 are illustrative of sections taken at various points along the tape as it is being cut to form teeth and bent to channel section.

FIGS. 10, 11, 12 and 13 are sectional views illustrating progressive steps in the assembly of a brush strip.

FIG. 14 is a sectional view illustrating the use of a slightly modified form of core strip for locking fill material in a channel backing element.

FIG. 15 is a sectional view of the assembled strip illustrated as being in process of formation in FIG. 14.

FIGS. 16, 17 and 18 are illustrations of several alternative shapes of channel sections as contemplated by the present invention.

Figure 3:
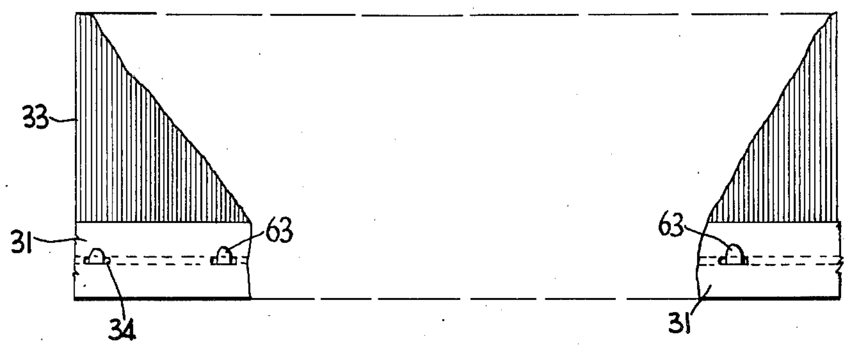
FIG. 3 is a side elevational view of a fragment of the strip as disclosed in FIG. 2.
Figure 2:
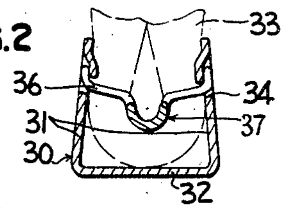
FIG. 2 is a sectional view of a typical brush strip embodying the invention.

In the brush strip construction as illustrated in FIGS. 2 and 3, a channel-form backing element 30, having side walls 31 and an intermediate web or bottom portion 32, is provided. The fill material or bristles 33 are of double length and may be of an appropriate filamentary material, such as springy wire, Tampico, nylon, cellulose acetate, glass fibers or the like. The channel backing element 30 is illustrated as having sides of substantially planar form which may be convergent, divergent or curved to provide a vast number of different sectional shapes, many of which are already common in the art. A few of these are illustrated in certain of the figures of the drawings and will be more fully described. Others obvious to those skilled in the art may also be used.

The side walls 31 of the channel backing element, shown in FIGS. 2 and 3, are formed with elongated holes or slots 34 for the reception of teeth 36 projecting laterally from the longitudinally extending fill locking core 37. The shape and manner of forming this core are more fully illustrated in FIGS. 5–9 of the drawings, in which the core is illustrated as being formed from a ribbon or tape 38 drawn from a supply roll 39 upon a shaft 41.

In forming the toothed core from the strip 38, the latter preferably is passed between appropriate forming rollers to form a trough or V-shaped mid-portion as indicated at 42 and flat side portions as indicated at 43. Subsequently, the side portions 43 are notched as indicated at 44, to provide the series of laterally extending teeth 36 already referred. If desired, the edges of portion 42 may then be further shaped and deepened into rib or corrugation **42*a* by appropriate treatment, for example, by passing between a pair of shaping rollers indicated in phantom at 46 and 47. The first of these is provided with a longitudinal section at its outer perimeter corresponding to the shape of the inner surface of the core 37, and the second (47) is formed with a grooved, peripheral surface corresponding to the outer surface of said core. The core as it emerges from between the rollers 46 and 47**, is approximately of the section illustrated in FIG. 9.

Figure 4:
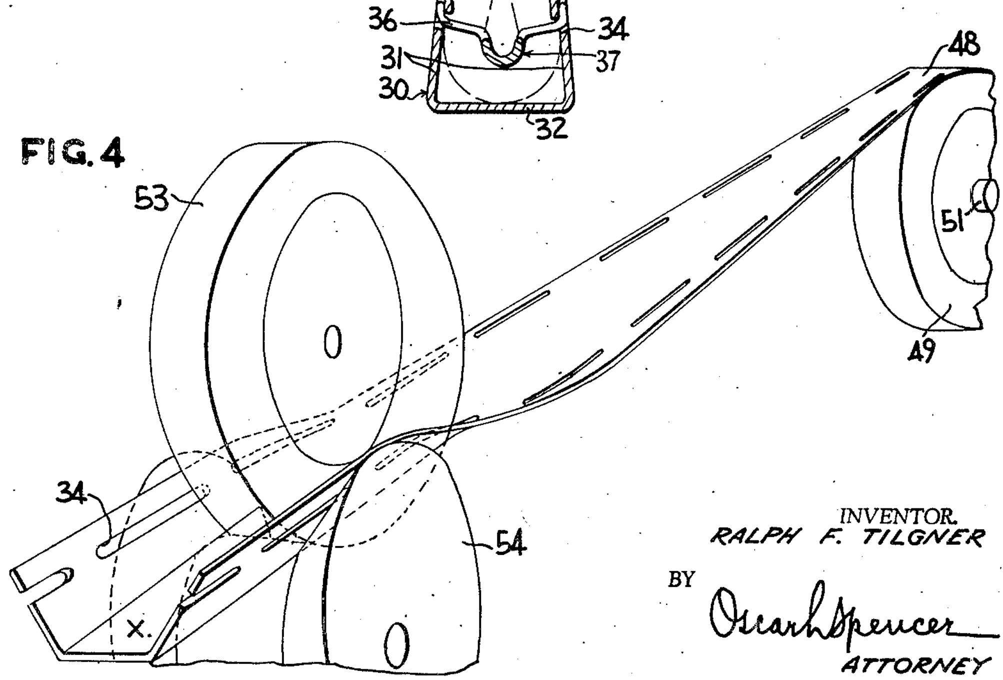
FIG. 4 is an isometric view illustrating a preliminary stage in the formation of a channel backing element from a strip of sheet steel or other metal, wound as a ribbon upon a suitable supply roller.

As illustrated in FIG. 4 of the drawing, the channel backing element 30 is also formed from a flat, metallic strip or ribbon 48, wound in a supply roll 49 upon a shaft 51. This strip is provided with the series of elongated holes or slots 34, already mentioned, formed along lines spaced inwardly from the margins of the strip and being at intervals with respect to each other corresponding to the spacing of the teeth upon the core 37.

If desired, the slots 34 may be formed at or near the zone constituting the neutral axis of the formed channel, so that when the channel is wrapped to spiral form, there will be but little, if any, change in the spacing of the slots. In event that the slots are not at the neutral axis, a slight differential may be provided between the spacing of slots and of the teeth so that as the strip is wound, the change in spacing of the slots due to bending of the channel, will automatically be compensated for and there will be no accumulation of errors to bring the teeth out of register with the slots.

The strip may be formed in well known manner to a partial channel form as indicated at X, and for purposes of imparting such form, a pair of opposed shaping rollers 53 and 54 may be provided. One of these rollers (53) is male while the other (54) is female, thus providing for the shaping of the strip to channel form with divergent sides.

The assembly of the fill material 33, the partially formed channel backing element illustrated in FIG. 4, and the partially formed core as illustrated in FIG. 5, to form a brush strip, is illustrated in the series comprising FIGS. 10 through 13 and is illustrated as comprising the distribution of a layer L of double length fill material across and approximately symmetrically upon the upper edges of the divergent side walls of the partially formed channel. The core 37 having the laterally extending teeth 36, is then disposed upon the mid-portions of the fill material. The teeth, as shown in said FIG. 10, may be either straight as indicated in the drawing in solid line, or they may be downwardly curved to facilitate entrance thereof into the slots 34.

Each tooth is disposed directly over its corresponding opening in the side wall. In order to compensate for the stretching of the side walls of the channel when it is spiralized, the teeth may have a slightly greater spacing than that of the openings as initially formed in the backing strip. When the brush strip is spiralized, the spacing of the teeth and openings is made to correspond. Any tendency for accumulation of error in the register of teeth and openings is thus reduced to a minimum.

As shown in FIG. 11, the core 37 may be pressed downwardly into the partially formed channel backing element to press the mid-portions of the fill material down in contiguity to the bottom portion 32 of the channel and to bring the tips of the teeth to rest upon the lower edges of slot 34 in the side walls 31. In performing the pressing operation, the assembly may be passed between a pair of rollers, the lower of which (57) is grooved to fit the lower surface of the partially formed channel strip and the upper of which (58) is contoured to fit within the channel formed by the core 37. These rollers function in combination accurately to maintain the channel and the core in proper relationship with each other and to bring the tips of the teeth 36 into alignment with the slots 34.

As shown in FIG. 12, the side wall portions 31 are then squeezed toward each other to cause the fill material to be doubled vertically upwardly and thus to bring the end portions upon one side thereof into contiguity with those upon the other side. At the same time, the tip portions of the teeth 36 are caused to pass through the holes or slots 34 of the side walls. Any convenient instrumentality may be employed to perform this operation. It may be performed manually, but for purposes of illustration, it is shown as being performed by a set of rollers, the lower ones (59) of which are grooved to fit the bottom portion 32 of the channel backing strip. The side walls are bent upwardly and inwardly by means of opposed rollers 61 and 62, which are illustrated as being of downwardly pointed frustoconical section, whereby to impart inward convergence to the two walls. Obviously, the several rollers could have other appropriate shapes, e.g., cylindrical, for purposes of imparting desired shape to the channel backing element.

The final shape of the section of the brush strip is illustrated in FIG. 13, in which the tips of the teeth are clinched upwardly as indicated at 63. This clinching operation may be performed by passing the strip between opposed rollers or by drawing it through a shoe 64, shown in FIG. 24, having a section corresponding to the outer surface of the channel backing of the brush strip. The upper surfaces of the sides of the shoe may be formed with cam-like surfaces 65 which initially contact the lower surfaces of the teeth and progressively urge them upwardly as the strip advances through the shoe. As shown in FIG. 13, the side walls of the shoe conform to the side walls 31 of the channel backing in such manner as to cause the tip portions of the teeth to be impressed into the metal of the side wall, forming recesses or pockets 67, thus maintaining the outer surfaces in substantially flush relationship with respect to the surfaces of the side walls 31. Another type of teeth is illustrated in FIG. 2 of the drawings as being bent upwardly upon the unindented side walls and is advantageous in those instances where it is desired to provide spacing between the turns of the brush strip to promote ventilation. It will also be appreciated that, if desired, the pockets or recesses 67 may be preformed in the side walls 31 at the time of or subsequent to the punching of holes or slots 34. In the form illustrated in FIGS. 14 and 15, the marginal portions of the side walls 70 are provided with offset portion 71 immediately above the openings formed at 72, for the reception of the teeth of the core element 73. The teeth 74 of the latter, when clinched as indicated at 76, are thus disposed substantially flush with the upper portion 70 of the wall. A smooth bearing surface between the sides of contiguous turns of the brush strip is thus provided.

Figure 17:
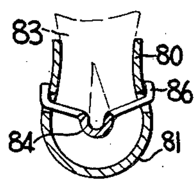

In the form of the invention as disclosed in FIG. 17, the side walls 80 of the channel backing strip are convergent and are interconnected by an intermediate portion 81 of arcuate shape and which thus more closely follows the bend of the bight portions of the fill material indicated at 83. The core 84, having teeth 86 securing the side walls together, substantially corresponds to those already shown and described, for example, in FIG. 2, etc.

Figure 18:
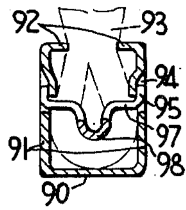

In the construction as illustrated in FIG. 18, the channel backing element is provided with bottom portion 90 and vertical side walls 91, the margins of which are inwardly bent as indicated at 92, compactly to confine the projecting proportions of the fill material 93. In this construction as illustrated, recesses 94 are formed for the clinched portions 95 of the teeth 97 upon the longitudinally extending core 98. The latter is of the design already described.

Modification in the section of the channel backing elements has been described in some detail. It will be apparent that modification of the longitudinally extending core is also permissible and a few of the possibilities are illustrated in the drawing. For example, in the form shown in FIG. 16, the channel backing element is essentially the same as that shown, for example, in FIG. 13. In this embodiment, the core, instead of being U-shaped, is actually folded upon itself in such manner as to reduce the space occupied by the core to a minimum. Additional space for fill material is thus provided within the channel.

Figure 19:
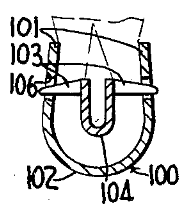
FIG. 19 is a sectional view illustrating a modified form of fill locking core.
Figure 20:
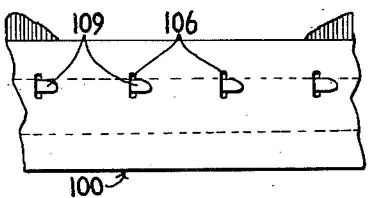
FIG. 20 is a fragmentary side view of the construction shown in FIG. 19.
Figure 21:
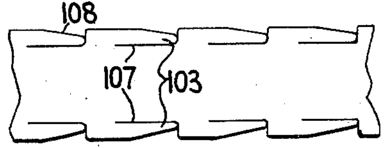
FIG. 21 is a fragmentary plan view of a strip from which the core illustrated in FIG. 19 is formed.

In the construction as illustrated in FIGS. 19, 20 and 21, a channel backing element 100 which may be approximately of U-shape section, is provided and comprises side walls 101 and an arcuate intermediate portion 102. The slots for the teeth 103 of a locking core 104, shown in FIG. 20, are disposed in vertical planes perpendicular to the side walls. The longitudinally extending locking core is indicated as being formed of a flat strip of steel or other metal conformed to a substantially U-shaped cross section and, as shown in FIG. 21, having the edges slit along lines 107 to provide said teeth 103. If desired, the outer edges of the teeth may also be clipped away as indicated at 108, to provide tapered and cam-like surfaces, facilitating the entrance of the teeth in the slots 106. This constitutes an optional feature. The teeth 103 are bent at right angles to the plane of the strip and the latter is bent partially or completely to U-shape as indicated in FIG. 19.

The brush strip embodying the channel backing element and the locking core together with the fill material is assembled substantially in accordance with the process diagrammatically illustrated in FIGS. 10 through 13, already described. Obviously, the tips of the teeth are bent laterally as indicated at 109, rather than being bent vertically. Such bending operation is readily performed, for example, by passing the brush strip as it is formed between a suitable pair of opposed shoes or vertical rollers.

Figure 22:
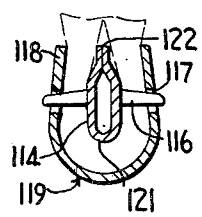
FIG. 22 is a sectional view of a further modified form of locking core for holding the fill material in the channel.
Figure 23:
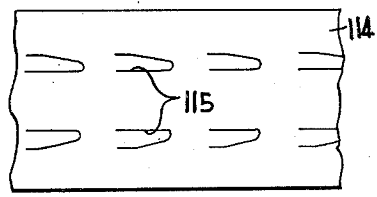
FIG. 23 is a fragmentary plan view of a strip from which the core shown in FIG. 22 is formed.

An additional form of locking core embodying teeth disposed in vertical planes is illustrated in FIGS. 22 and 23. In this embodiment of the invention, the core for locking the fill material in the channel comprises a tape 114 of sheet steel or other material, having pairs of longitudinally extending approximately U-shaped slits 115 formed therein and being designed to be bent laterally as indicated at 116, to provide teeth engaging openings 117 in the side walls 118 of the channel backing strip 119.

The mid-portions of the strip 114 are bent as indicated at 121, to impart to the core approximately U-shaped section. It is also apparent that the upper edges of the strip, if desired, may be bent into contact with each other and secured together as by spot welding or other appropriate means, along a line as at 122, thus providing in effect a closed tube of increased resistance to distortion as by bending or by outward springing of the side wall portions.

Figure 24:
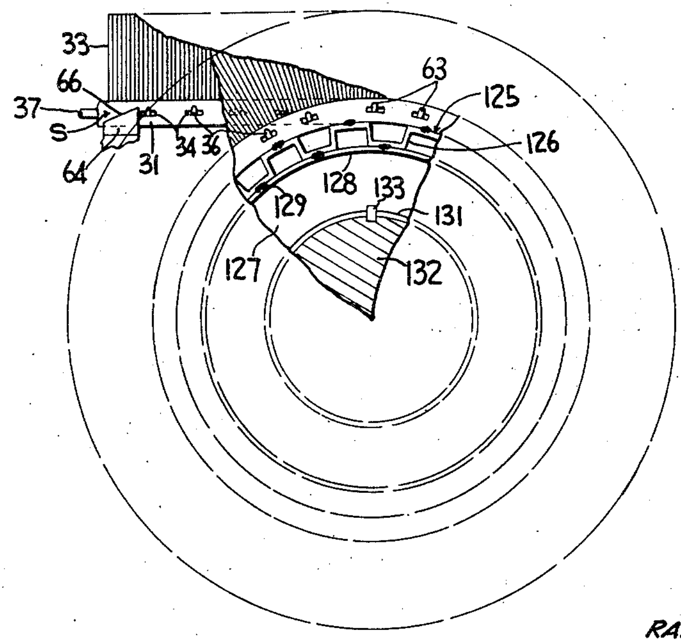
FIG. 24 is a view illustrating the winding of the novel brush strip upon an appropriate mandrel.

Brush strips S formed as described and embodying any desired section in the channel or in the core for the fill material indicated at 33, may be wound upon and secured to substantially any form of mandrel which may be desired. One such mandrel which has important advantages and is well adapted for use as a support for a spirally wound brush strip assembled in accordance with the provisions of this invention, is illustrated in FIG. 24. This construction embodies a tube, preferably formed of sheet metal as indicated at 125, and being formed with several longitudinally extending corrugations 126. Bushing rings 127 having outer marginal flanges 128, are welded to or secured by self-threading screws to the trough portions 129 of the corrugations. As many spaced bushing rings as may be desired (usually 2 to 6) may be secured within the mandrel in this manner. The bushing rings at their inner margins, are provided with lateral flanges 131 seating upon a suitable power driven shaft 132. The shaft and the bushing rings may be suitably grooved or slotted to receive a key 133 designed to hold the mandrel from rotation upon the shaft.

In the formation of a brush, one end of a brush strip S is secured at or near one end of the mandrel and the latter is then rotated slowly to wind the strip as a spiral upon the mandrel. When a sufficient number of turns has thus been mounted, the brush strip may be cut (in event that it is longer than necessary) and the end thereof may be secured as by welding or by suitable clamps or screws, to the mandrel.

It will be apparent that the strip may also be secured at spaced points along its length in order more securely to fasten it upon the mandrel. For purposes of so securing the channel backing of said strip, various means may be employed. One such means embodies welding of the channel backing to the crests of the corrugations. It will also be apparent that various clip devices may be employed for a like purpose.

Figure 1:
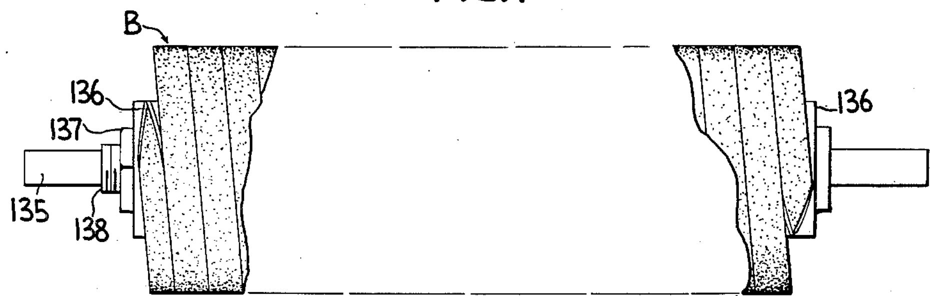

A finished brush B involving an appropriate number of turns upon the mandrel, may be mounted upon a shaft 135 as shown in FIG. 1. For this purpose, end plates 136 engaging the ends of the mandrel, may be employed. One or both of these end plates may be releasably clamped as by means of a screw-threaded nut 137 upon a threaded shoulder portion 138 of the shaft.

Some of the important advantages of the present construction embodying a longitudinally extending core having locking teeth for securing the core in the channel, may be recounted as follows: the teeth positively lock the core in place at numerous spaced points along its length so that it cannot be displaced by any reasonable forces exerted by centrifugation or by the action of the fill material against the work surface.

In event of loss of fill material due to some local weakness or accident in a given section of the brush strip, the loss of such material is localized by reason of the teeth upon the core. It is impossible for the fill material to creep longitudinally of the channel backing element.

The side walls of the channel backing element are positively held or locked from spreading under any forces which are likely to be exerted against the strip either in service or during such operations as winding.

The longitudinally extending core and the teeth thereupon provide conductive paths for the transfer of heat from within the fill material to the walls of the channel or to the air circulating about such channel, thus providing a substantial cooling effect to reduce the build-up of heat within the strip. It will be apparent to those skilled in the art that the embodiments of the invention as herein disclosed are by way of illustration. Obviously, numerous modifications may be made therein without departure from the spirit of the invention or from the scope of the appended claims.

This application is a division of copending application, Serial No. 824,568, filed July 2, 1959, now Patent No. 3,002,212 issued October 3, 1961.

I claim:

1. In a method of forming a rotary brush, the steps of providing a metallic tape adapted to be bent to channel-form cross section, bending such strip to provide a trough section having divergent side walls, each of said side walls having a longitudinally extending series of holes formed therein, laying double length fill material as a layer across the edges of the side walls, forming transverse teeth upon a tape, disposing the tape upon the fill material in a median zone between the side walls, the transverse teeth being spaced at intervals corresponding to the holes in said side walls, bending the side walls upwardly to provide a desired channel section and to force the tips of said teeth through said holes, and spirally winding the resultant brush strip to form said rotary brush.

2. The method as defined in claim 1 in which the teeth are clinched upon the side walls before the brush strip is spirally wound, whereby to secure the core in position within the channel backing.

3. In a method of forming a rotary brush, the steps of providing a first metallic tape, continuously bending said tape to intermediate, trough form having divergent side walls, each of said side walls having a longitudinally extending series of holes formed therein, placing a layer of double length fill material transversely disposed across the edges of the side walls with the mid-portions thereof between the side walls, forming a locking core for the fill material by continuously notching the edges of a second tape to provide teeth corresponding in number and spacing to the holes in said side walls, and also forming the second tape to channel section, disposing the core longitudinally upon the median zone of the fill material with each tooth above the corresponding opening in a side wall, rolling the locking core down between the side walls to bring the teeth into register with the holes in said side walls by means by a roller running in the channel of said locking core, and bending the side walls of the first-mentioned tape inwardly to force the tips of the teeth through the holes in said side walls and to impart to said first tape the desired channel form for said backing, clinching the teeth to lock the core into channel of said channel-form backing and winding the resultant brush strip upon a mandrel to provide said spirally wound brush.

4. In a method of forming a rotary brush, the steps of providing a first metallic tape, continuously bending said tape to an intermediate, trough form having divergent side walls, each of the side walls having a longitudinally extending series of holes formed therein, placing a layer of double length fill material across the edges of the side walls with the mid-portions thereof between the side walls, forming a locking core for the fill material by forming a second tape to channel section and notching the edges of said second tape to provide teeth corresponding in number to the holes in the side walls, disposing the resultant locking core longitudinally upon the median zone of the fill material with each tooth above the corresponding opening in the side wall, rolling the locking core down between the side walls to bring the teeth into vertical register with the holes in the side walls by means of a roller running in the channel of the locking core as a guide, the ends of the teeth being brought to rest upon the lower edges of the holes, bending the side walls inwardly to force the tips of the teeth through the holes and to impart to the first-mentioned tape the desired channel form for the said backing, clinching the teeth to lock the core into the channel backing and winding the resultant brush strip upon a mandrel to provide said spirally wound brush.

References Cited in the file of this patent

UNITED STATES PATENTS

| | | |
|---|---|---|
| 1,963,044 | Bickel | June 12, 1934 |
| 2,817,108 | Van Clief | Dec. 24, 1957 |